(12) United States Patent
Lim et al.

(10) Patent No.: US 10,518,805 B2
(45) Date of Patent: Dec. 31, 2019

(54) KNUCKLE APPARATUS FOR VEHICLE SUSPENSION SYSTEM

(71) Applicants: Hyundai Motor Company, Seoul (KR); Kia Motors Corporation, Seoul (KR)

(72) Inventors: Dong Min Lim, Hwaseong-si (KR); Jae Kil Lee, Suwon-si (KR); Kyu Wan Lee, Seoul (KR); Patrick Alain Hasselt, Alzenau (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 97 days.

(21) Appl. No.: 15/717,778

(22) Filed: Sep. 27, 2017

(65) Prior Publication Data

US 2018/0265126 A1 Sep. 20, 2018

(30) Foreign Application Priority Data

Mar. 15, 2017 (KR) ........................ 10-2017-0032396

(51) Int. Cl.
| | | |
|---|---|---|
| *B62D 7/18* | (2006.01) | |
| *B62D 7/20* | (2006.01) | |
| *B60B 27/00* | (2006.01) | |
| *B60B 27/02* | (2006.01) | |

(52) U.S. Cl.
CPC ............ *B62D 7/18* (2013.01); *B60B 27/0063* (2013.01); *B62D 7/20* (2013.01); *B60B 27/001* (2013.01); *B60B 27/02* (2013.01); *B60G 2200/44* (2013.01); *B60G 2204/129* (2013.01); *B60G 2204/148* (2013.01); *B60G 2204/43* (2013.01); *B60G 2204/61* (2013.01); *B60G 2206/50* (2013.01); *B60G 2206/91* (2013.01)

(58) Field of Classification Search
CPC ........ B62D 7/18; B62D 7/20; B60B 27/0063; B60G 2206/91; B60G 2206/50; B60G 2204/148; B60G 2204/129; B60G 2204/43; B60G 2200/44
USPC ...................................... 280/93.512, 124.125
See application file for complete search history.

(56) References Cited

U.S. PATENT DOCUMENTS

| | | | | |
|---|---|---|---|---|
| 3,852,872 | A * | 12/1974 | Afanador ................ | B23P 11/02 29/447 |
| 3,908,480 | A * | 9/1975 | Afanador ................ | B62D 7/18 280/93.512 |
| 3,940,159 | A * | 2/1976 | Pringle .................... | B62D 7/18 280/88 |
| 4,582,338 | A * | 4/1986 | Colanzi ............... | B60B 27/0005 280/124.146 |

(Continued)

FOREIGN PATENT DOCUMENTS

| | | | |
|---|---|---|---|
| DE | 102017103610 A1 * | 8/2018 | ............... B62D 7/18 |
| FR | 3004993 A1 * | 10/2014 | ............... B62D 7/18 |

(Continued)

*Primary Examiner* — Keith J Frisby
(74) *Attorney, Agent, or Firm* — Morgan, Lewis & Bockius LLP

(57) ABSTRACT

A knuckle apparatus for a vehicle suspension system, may include a bearing device having an assembly end portion protruding and extending from a center thereof; and a knuckle device having a plurality of brackets connected to a suspension system component, the brackets being coupled through the assembly end portion.

17 Claims, 6 Drawing Sheets

(56) References Cited

U.S. PATENT DOCUMENTS

| | | | | |
|---|---|---|---|---|
| 4,722,540 | A | * | 2/1988 | Kozyra .................. B60T 1/065 180/253 |
| 5,120,150 | A | * | 6/1992 | Kozyra ................. B60G 7/008 403/24 |
| 6,138,357 | A | * | 10/2000 | Jones ....................... B62D 7/18 280/93.512 |
| 6,152,466 | A | * | 11/2000 | Op Den Camp ...... B60G 15/07 280/93.512 |
| 6,179,308 | B1 | * | 1/2001 | Mielauskas ............. B60T 1/067 180/252 |
| 2005/0057015 | A1 | * | 3/2005 | Frantzen ................ B60G 7/008 280/124.144 |
| 2006/0054423 | A1 | * | 3/2006 | Murata ................... F16D 55/22 188/18 A |
| 2012/0013095 | A1 | * | 1/2012 | Gerrard ................... B60G 3/26 280/124.134 |

FOREIGN PATENT DOCUMENTS

| | | | | |
|---|---|---|---|---|
| JP | 08324450 | A | * 12/1996 | ........... B21C 23/142 |
| JP | 2010-47043 | A | 3/2010 | |
| KR | 10-2007-0050183 | A | 5/2007 | |
| KR | 100779351 | B1 | * 11/2007 | |
| KR | 10-2009-0115601 | A | 11/2009 | |
| KR | 10-2010-0048382 | A | 5/2010 | |
| KR | 10-2013-0063722 | A | 6/2013 | |
| KR | 20130063722 | A | * 6/2013 | |
| KR | 10-2013-0087848 | A | 8/2013 | |
| KR | 20150065222 | A | * 6/2015 | |
| WO | WO-9713665 | A1 | * 4/1997 | .............. B60T 1/065 |

* cited by examiner

KNUCKLE APPARATUS FOR VEHICLE SUSPENSION SYSTEM

CROSS-REFERENCE(S) TO RELATED APPLICATIONS

The present application claims priority to Korean Patent Application No. 10-2017-0032396 filed on Mar. 15, 2017, the entire contents of which is incorporated herein for all purposes by this reference.

BACKGROUND OF THE INVENTION

Field of the Invention

The present invention relates to a knuckle apparatus for a vehicle suspension system. More particularly, the present invention relates to a knuckle apparatus which enables suspension system components connected to the knuckle to be freely changed.

Description of Related Art

In general, vehicles are disposed with suspension systems that improve riding comfort and inhibit load damage by preventing vibrations or shocks from being directly transferred from the road to the vehicle bodies while the vehicles travel.

Meanwhile, a knuckle for a vehicle, which is configured as power transmission, vehicle braking, and/or load support, has a hub bearing connected to a driveshaft, and a connection portion for mounting a lower arm, a tie rod, a brake caliper, etc. thereto.

However, in the conventional knuckle, the connection member for mounting the lower arm, the tie rod, the brake caliper, etc. thereto is a one-piece member. Thus, when there is a need to change mounted members including suspension geometries or brake systems, it is necessary to design and manufacture a new knuckle for the same.

In addition, since the knuckle is a one-piece member, it includes a single material. Hence, it is disadvantageous in terms of weight and material since the portions of the knuckle must include only the same material even when they need to include different materials.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a knuckle apparatus for a vehicle suspension system, which is configured for having an optimized weight wherein the suspension system components connected to a knuckle include different materials by changing a portion to be substituted of the suspension system components to alter only a point corresponding to the changed component. In addition, it is possible to reduce a manufacturing cost of the knuckle apparatus since there is no need to redesign the whole knuckle for each changed connection component.

In accordance with an aspect of the present invention, a knuckle apparatus for a vehicle suspension system includes a bearing device having an assembly end portion protruding and extending from a center thereof, and a knuckle device having a plurality of brackets connected to a suspension system component, the brackets being coupled through the assembly end portion.

The bearing device may include a wheel hub having the assembly end portion protruding and extending from a center thereof, and a wheel bearing provided in the assembly end portion of the wheel hub.

The wheel hub may have a flange formed at the center thereof while the assembly end portion protrudes from the flange, and the flange may have a recessed groove formed around the assembly end portion.

The bearing device may further include a locking ring configured to surround the assembly end portion and fitted to an extended end portion of the assembly end portion, to lock the knuckle device coupled through the assembly end portion.

The assembly end portion may have a plurality of fitting protrusions formed circumferentially on an external peripheral surface thereof at the end portion thereof to protrude therefrom, and the locking ring may have a plurality of fitting grooves formed on an internal peripheral surface thereof to correspond to the fitting protrusions.

The locking ring may have a plurality of recessed grooves formed circumferentially on a side thereof.

The suspension system component may include a lower arm and a shock absorber, and the knuckle device may include a first bracket connected to the lower arm and a second bracket connected to the shock absorber.

The first bracket may include a first body having a first through-hole through which the assembly end portion passes, and a first mounting end portion extending from the first body to be connected to the lower arm.

The first body of the first bracket may have a plurality of recessed grooves formed around the first through-hole.

The second bracket may include a second body having a second through-hole through which the assembly end portion passes, and a second mounting end portion extending from the second body to be connected to the shock absorber.

The second body of the second bracket may have a plurality of recessed grooves formed around the second through-hole.

The suspension system component may further include a tie rod, the knuckle device may further include a third bracket connected to the tie rod, and the third bracket may include a third body having a third through-hole through which the assembly end portion passes, and a third mounting end portion extending from the third body to be connected to the tie rod.

The third body of the third bracket may have a plurality of recessed grooves formed around the third through-hole.

The suspension system component may further include a brake caliper, the knuckle device may further include a fourth bracket connected to the brake caliper, and the fourth bracket may include a fourth body having a fourth through-hole through which the assembly end portion passes, and a fourth mounting end portion extending from the fourth body to be connected to the brake caliper.

The fourth body of the fourth bracket may have a plurality of recessed grooves formed around the fourth through-hole.

A long bolt may be fastened to the brackets of the knuckle device in a direction in which the assembly end portion extends, wherein the brackets are integrally fastened to each other.

As apparent from the above description, in accordance with the knuckle apparatus for a vehicle suspension system having the above-mentioned structure, since the suspension system components connected to the knuckle include different materials by changing a portion to be substituted of the suspension system components to alter only a point corresponding to the changed component, the weight of the knuckle apparatus can be optimized. In addition, it is possible to reduce manufacturing costs of the knuckle apparatus since there is not a need to redesign the whole knuckle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
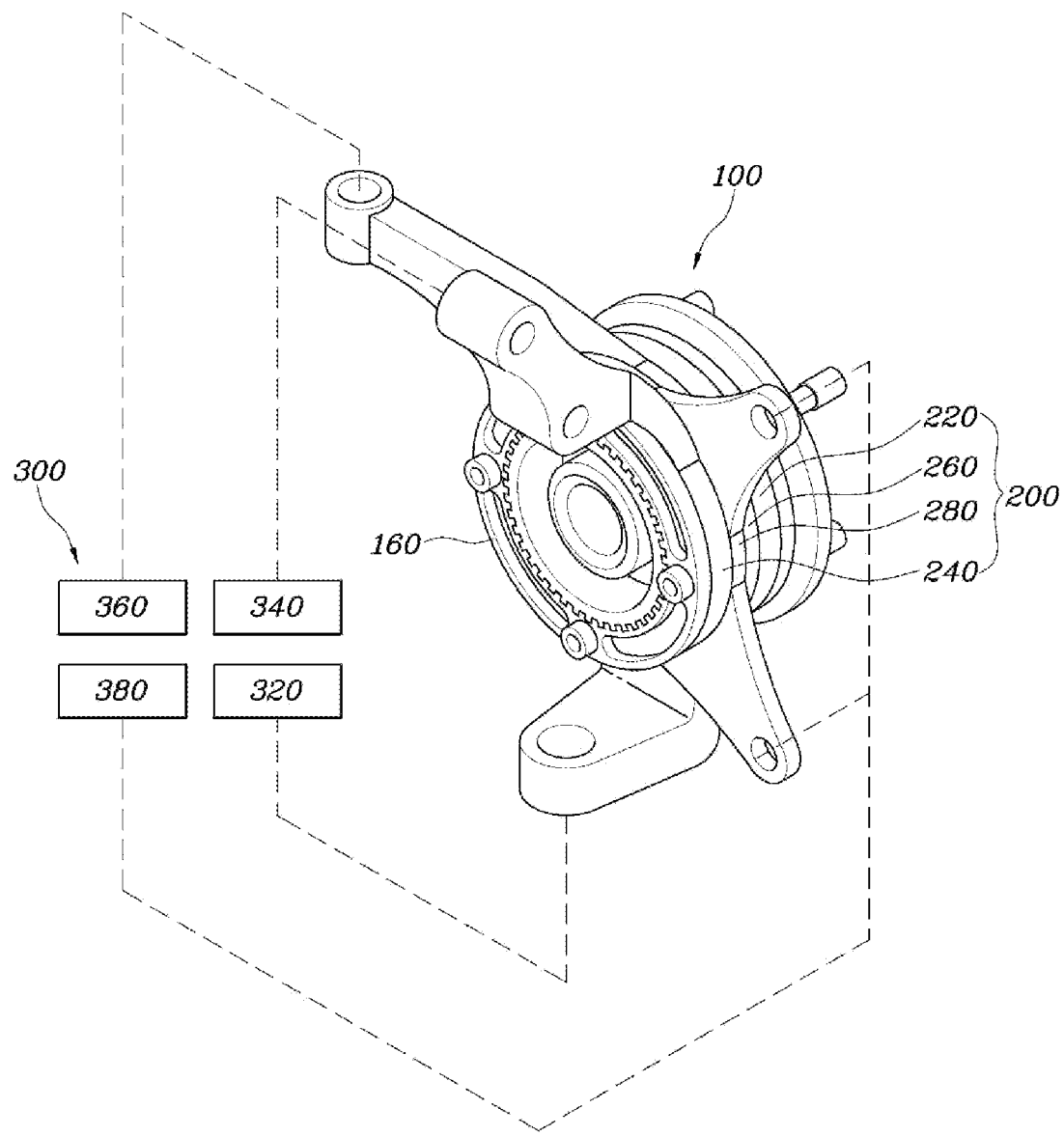
FIG. 1 is a view illustrating a knuckle apparatus for a vehicle suspension system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended Claims.

Figure 2:
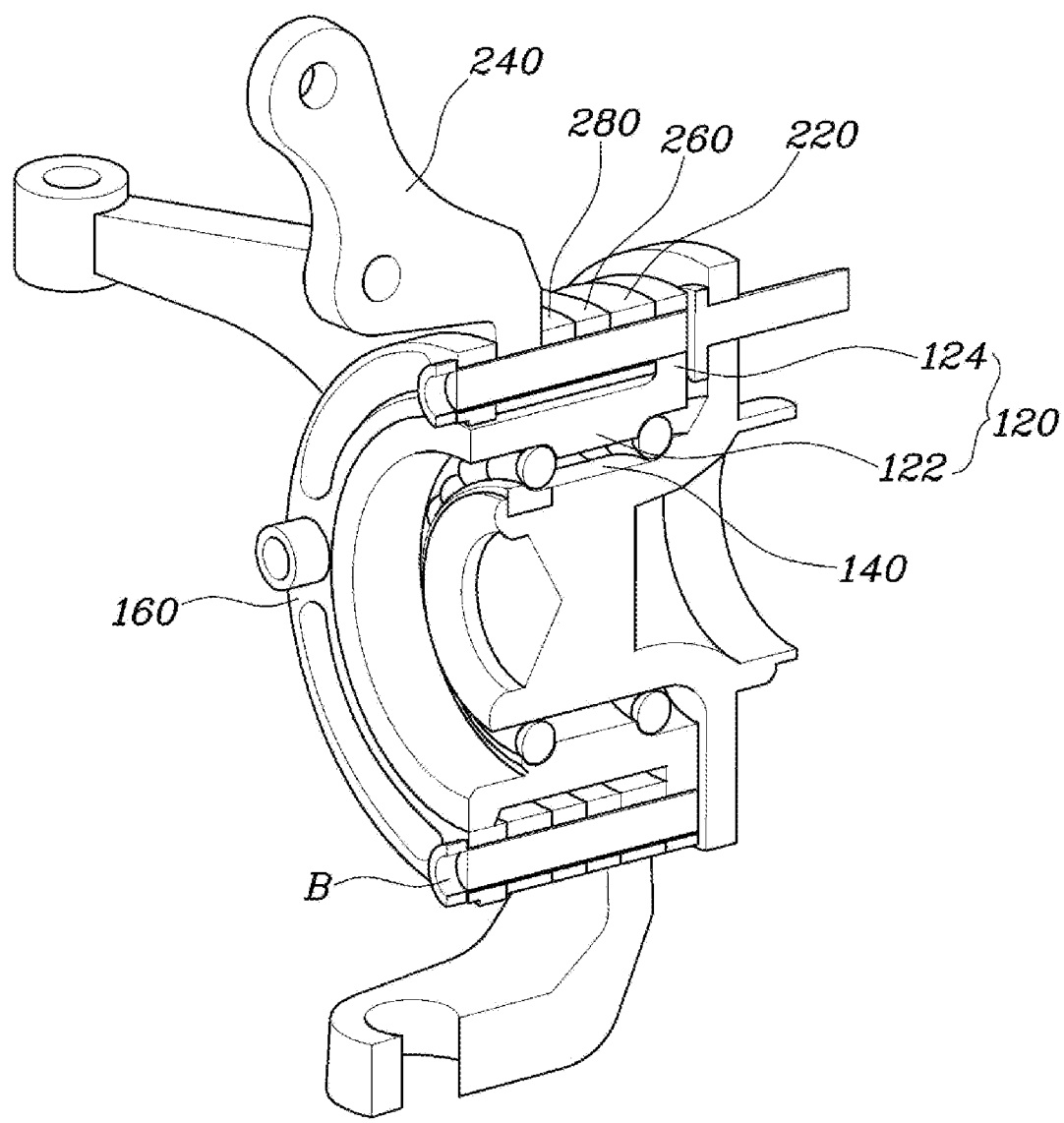
FIG. 2 is a cross-sectional view illustrating the knuckle apparatus for a vehicle suspension system of FIG. 1.
Figure 3:
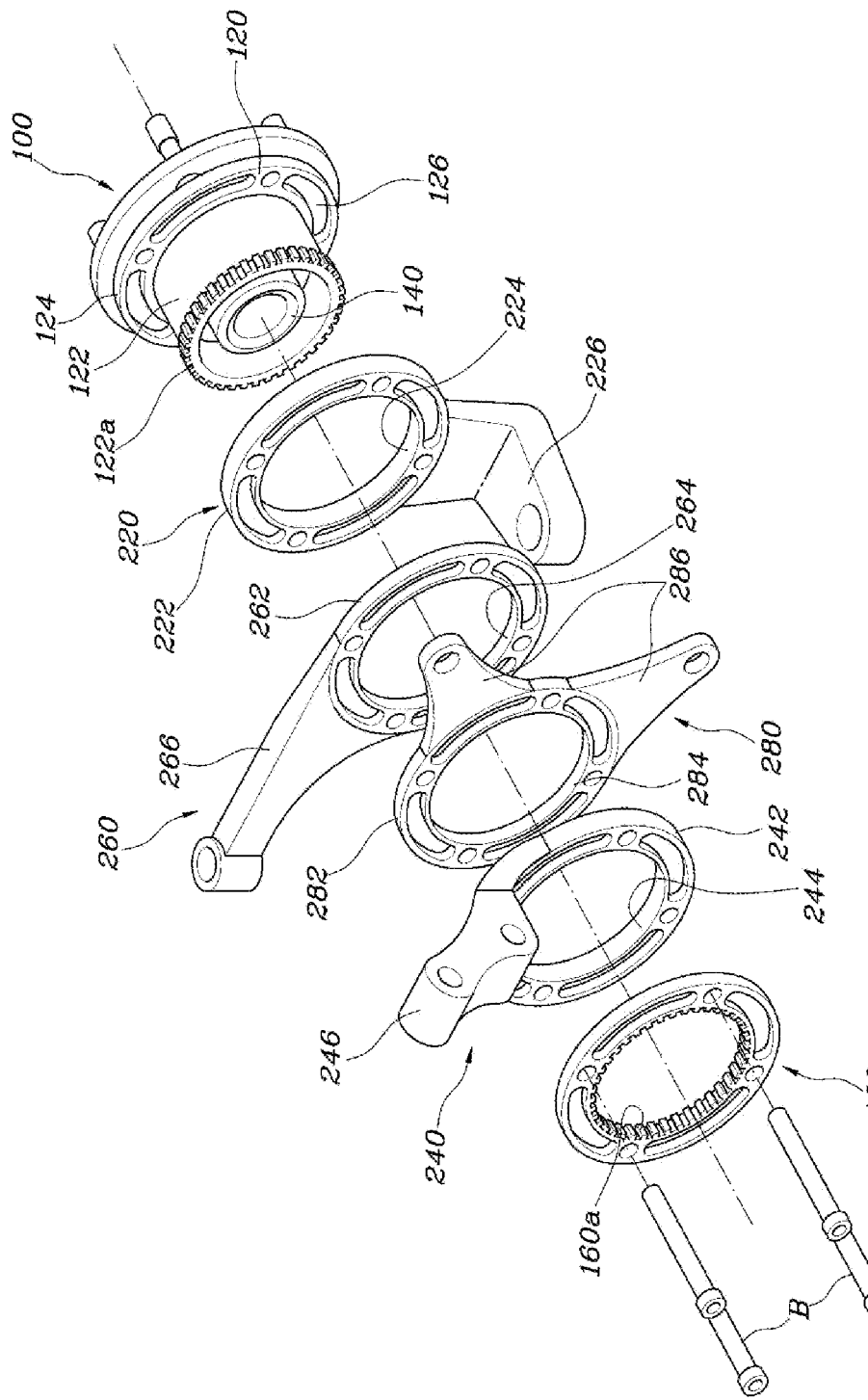
FIG. 3 is an assembly view illustrating the knuckle apparatus for a vehicle suspension system of FIG. 1.
Figure 4:
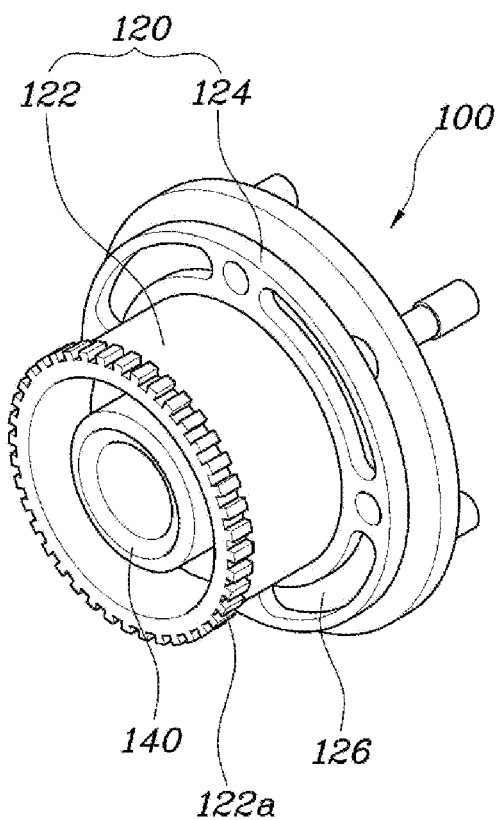
FIG. 4, FIG. 5, FIG. 6, FIG. 7, FIG. 8, and FIG. 9 are views for explaining the knuckle apparatus for a vehicle suspension system of FIG. 1.

FIG. 1 is a view illustrating a knuckle apparatus for a vehicle suspension system according to an exemplary embodiment of the present invention. FIG. 2 is a cross-sectional view illustrating the knuckle apparatus for a vehicle suspension system of FIG. 1. FIG. 3 is an assembly view illustrating the knuckle apparatus for a vehicle suspension system of FIG. 1. FIG. 4 to FIG. 9 are views for explaining the knuckle apparatus for a vehicle suspension system of FIG. 1.

As illustrated in FIG. 1 to FIG. 3, the knuckle apparatus for a vehicle suspension system according to the exemplary embodiment of the present invention includes a bearing device 100 that has an assembly end portion 122 formed at the center to protrude and extend therefrom, and a knuckle device 200 that has a plurality of brackets connected to suspension system components 300, wherein the brackets are coupled through the assembly end portion 122.

As described above, the knuckle apparatus includes the bearing device 100 and the knuckle device 200. The bearing device 100 may include a wheel bearing 140 therein and have a mounting bolt for mounting a wheel. The bearing device 100 has the assembly end portion 122 formed to protrude therefrom, and the constituent brackets of the knuckle device 200 are sequentially connected through the assembly end portion 122.

That is, the knuckle device 200 includes a plurality of brackets, and the brackets are connected to the suspension system components 300, respectively. For example, in the case where the suspension system components 300 connected to the knuckle are a lower arm 320, a shock absorber 340, and a tie rod 360, the brackets are a bracket connected to the lower arm 320, a bracket connected to the shock absorber 340, and a bracket connected to the tie rod 360, and each bracket is coupled through the assembly end portion 122 of the bearing device 100 to form a knuckle assembly.

Since different shocks are transferred to the lower arm 320, the shock absorber 340, and the tie rod 360, the brackets may be designed differently for various required strengths. Thus, the brackets may include different materials according to the strength thereof to optimize the weight of the knuckle apparatus.

In addition, even when a specification of the lower arm 320, the shock absorber 340, and the tie rod 360 of the suspension system components 300 is changed, it is possible to fluidly cope with a change in components by substituting the corresponding bracket to a bracket more suitable for the changed specification. Therefore, it is possible to significantly reduce manufacturing costs by altering only a point corresponding to the changed component, compared to changing the whole knuckle as in the related art.

In more detail, the bearing device 100 may include a wheel hub 120 that has the assembly end portion 122 formed at the center thereof to protrude and extend therefrom, and a wheel bearing 140 that is provided in the assembly end portion 122 of the wheel hub 120, as illustrated in FIG. 1, FIG. 2, FIG. 3, and FIG. 4.

As described above, the bearing device 100 may include the wheel hub 120 that has the assembly end portion 122, and the wheel bearing 140 that is provided in the wheel hub 120. The wheel bearing 140 may include an external ring, a ball or a roller, and an internal ring. The wheel bearing 140 is typically provided in the wheel hub 120, and therefore the specific connection structure thereof will be omitted.

The wheel hub 120 of the bearing device 100 is formed with the assembly end portion 122, and the assembly end portion 122 protrudes and extends from the center of the wheel hub 120. That is, the assembly end portion 122 may have a hollow cylindrical shape, and may extend wherein the constituent brackets of the knuckle device 200 are connected through the assembly end portion 122.

Figure 5:
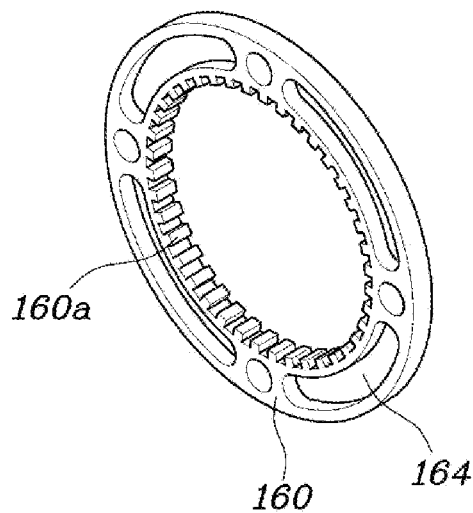

As illustrated in FIG. 3 and FIG. 5, the bearing device 100 may further include a locking ring 160 that surrounds the assembly end portion 122 and is fitted to the extended end portion of the assembly end portion 122 to lock the knuckle device 200 coupled through the assembly end portion 122. The locking ring 160 may have an annular shape configured to surround the assembly end portion 122, and is fitted to the assembly end portion 122 to lock the knuckle device 200 coupled through the assembly end portion 122 so that the knuckle device 200 is not decoupled from the assembly end portion 122.

The assembly end portion 122 may have a plurality of fitting protrusions 122a formed circumferentially on the external peripheral surface thereof at the end portion thereof to protrude therefrom, and the locking ring 160 may have a plurality of fitting grooves 160a formed on the internal peripheral surface thereof to correspond to the fitting protrusions 122a. Thus, the locking ring 160 may be more strongly fastened to the assembly end portion 122 to prevent being decoupled therefrom by forming the fitting protrusions 122a on the external peripheral surface of the assembly end portion 122 and the fitting grooves 160a on the internal peripheral surface of the locking ring 160.

The wheel hub 120 has a flange 124 which is formed at the center thereof and from which the assembly end portion 122 protrudes. The flange 124 may have recessed grooves 126 formed around the assembly end portion around 122.

The locking ring 160 may have a plurality of recessed grooves 164 formed circumferentially on a side thereof.

The recessed grooves 126 formed in the flange 124 of the wheel hub 120 and the recessed grooves 164 formed in the locking ring 160 are configured to reduce the weights of the wheel hub and the locking ring. When the total weight of the knuckle is reduced, the driving and steering performance of the vehicle can be improved. Therefore, the present invention can reduce the weights of the wheel hub 120 and the locking ring 160 by forming the recessed grooves 126 and 164 in the wheel hub 120 and the locking ring 160 respectively.

As illustrated in FIG. 1 and FIG. 3, the suspension system components 300 include the lower arm 320 and the shock absorber 340. The knuckle device 200 may include a first bracket 220 connected to the lower arm 320 and a second bracket 240 connected to the shock absorber 340.

That is, the suspension system components 300 connected to the knuckle may include the lower arm 320 and the shock absorber 340, and in the case where the lower arm 320 and the shock absorber 340 are connected to the knuckle device 200, the knuckle device 200 may include the first bracket 220 connected to the lower arm 320 and the second bracket 240 connected to the shock absorber 340. Thus, in the state in which the first and second brackets 220 and the 240 are assembled to the bearing device 100, the suspension system components 300 may be connected to the knuckle apparatus by connecting the lower arm 320 and the shock absorber 240 to the respective first and second brackets 220 and 240.

Figure 6:
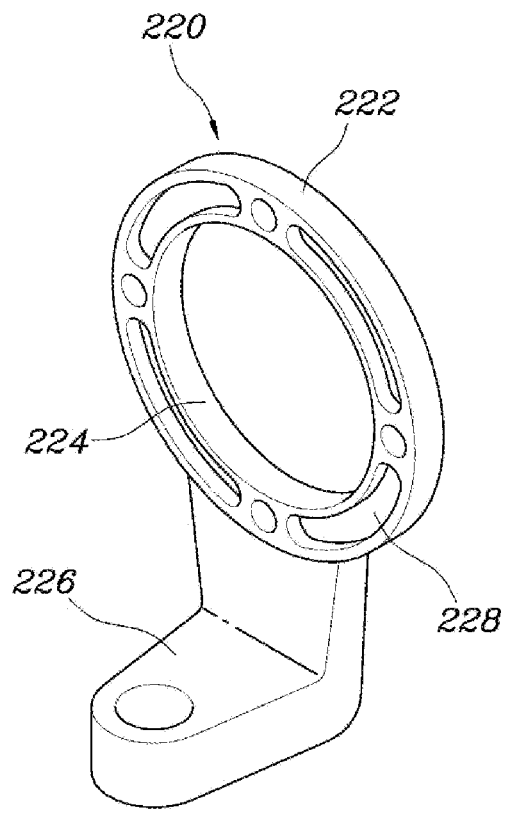

In detail, the first bracket 220 may include a first body 222 that has a first through-hole 224 through which the assembly end portion 122 passes, and a first mounting end portion 226 that extends from the first body 222 and is connected to the lower arm 320, as illustrated in FIG. 6.

That is, the first bracket 220 has the first through-hole 224 formed in the center of the first body 222 so that the assembly end portion 122 is connected through the first through-hole 224, and the first mounting end portion 226 extends outward from the first body 222 to be connected to the lower arm 320. The first mounting end portion 226 may be designed to extend from the first body 222 in different directions according to the lower arm 320 applied to a left or right wheel. The lower arm 320 may be connected to the extended end portion of the first mounting end portion 226 by a ball joint. Since the lower arm 320 is connected to the knuckle bracket by the ball joint in a typical manner, the specific description and drawing thereof will be omitted.

The first body 222 of the first bracket 220 may have a plurality of recessed grooves 228 formed around the first through-hole 224.

The weight of the first bracket 220 can be reduced by forming the recessed grooves 228 in the first body 222 of the first bracket 220. Of course, a single recessed groove may be formed to extend along the circumference of the first body 222, instead of the plurality of divided recessed grooves 228. The structure may be selectively applied according to the required strength of the first bracket 220 and the fastening position of the bolt.

Figure 7:
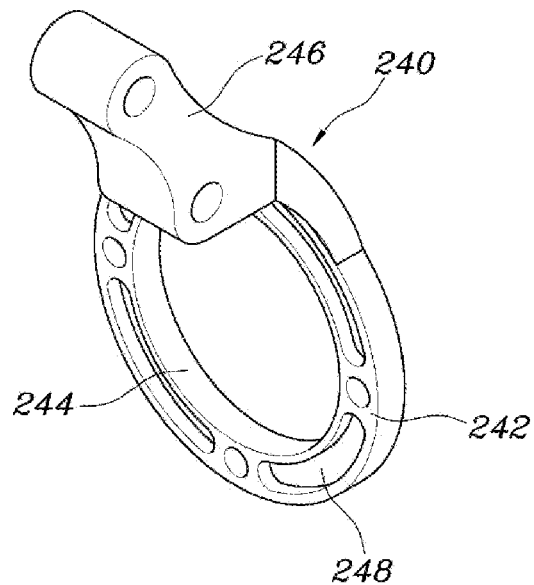

As illustrated in FIG. 7, the second bracket 240 may include a second body 242 that has a second through-hole 244 through which the assembly end portion 122 passes, and a second mounting end portion 246 that extends from the second body 242 and is connected to the shock absorber 340.

The second bracket 240 has the second through-hole 244 formed in the center of the second body 242 so that the assembly end portion 122 is connected through the second through-hole 244, and the second mounting end portion 246 extends outward from the second body 242 to be connected to the shock absorber 340. The second mounting end portion 246 may be formed to extend from the second body 242 in different directions according to the shock absorber 340 applied to the left or right wheel. The shock absorber 340 may be connected to the extended end portion of the second mounting end portion 246. The second mounting end portion 246 may be bolted to the shock absorber 340 through a separate bracket. Since the shock absorber 340 is connected to the knuckle in a typical manner, the detailed structure thereof will be omitted.

The second body 242 of the second bracket 240 may have a plurality of recessed grooves 248 formed around the second through-hole 244.

The weight of the second bracket 240 can be reduced by forming the recessed grooves 248 in the second body 242 of the second bracket 240. Of course, a single recessed groove may be formed to extend along the circumference of the second body 242, instead of the plurality of divided recessed grooves 248. The structure may be selectively applied according to the required strength of the second bracket 240 and the fastening position of the bolt.

Figure 8:
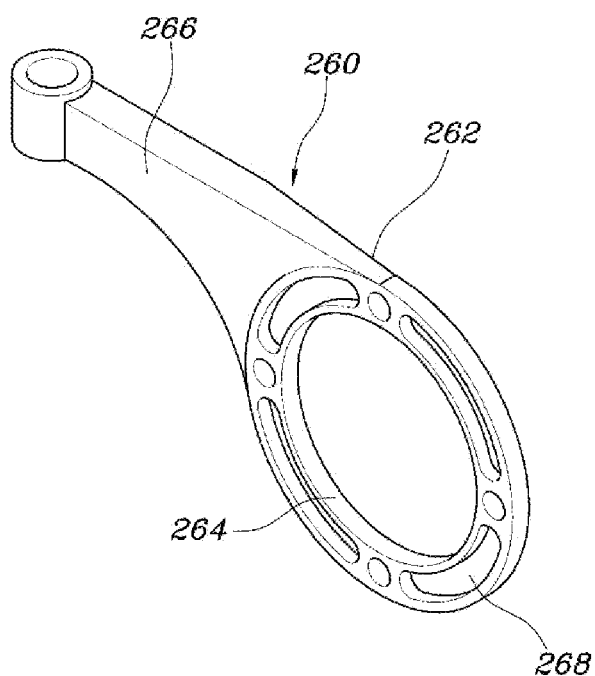

As illustrated in FIG. 1 and FIG. 8, the suspension system components 300 may further include the tie rod 360, the knuckle device 200 may further include a third bracket 260 connected to the tie rod 360, and the third bracket 260 may include a third body 262 that has a third through-hole 264 through which the assembly end portion 122 passes, and a third mounting end portion 266 that extends from the third body 262 and is connected to the tie rod 360.

That is, the suspension system components 300 connected to the knuckle may further include the tie rod 360, and the tie rod 360 may be connected to the third bracket 260 so that the tie rod 360 is assembled to the bearing device 100 together with the first and second brackets 220 and 240 to be connected to the knuckle apparatus.

To this end, the third bracket 260 includes the third body 262 having the third through-hole 264 and the third mounting end portion 266, and the third mounting end portion 266 is connected to the tie rod 360. The third mounting end portion 266 of the third bracket 260 may be designed to extend from the third body 262 in different directions according to the tie rod 360 connected to the left or right wheel. The tie rod 360 may be connected to the extended end portion of the third mounting end portion 266 by a ball joint. Since the tie rod 360 is connected to the knuckle by the ball joint in a typical manner, the detailed structure thereof will be omitted.

The third body 262 of the third bracket 260 may have a plurality of recessed grooves 268 formed around the third through-hole 264.

The weight of the third bracket 260 can be reduced by forming the recessed grooves 268 in the third body 262 of the third bracket 260. Of course, a single recessed groove may be formed to extend along the circumference of the third body 262, instead of the plurality of divided recessed grooves 268. The structure may be selectively applied according to the required strength of the third bracket 260 and the fastening position of the bolt.

Figure 9:
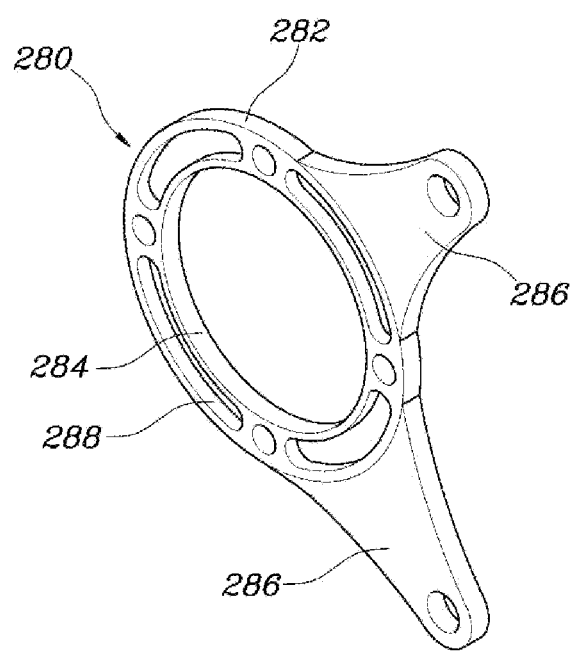

As illustrated in FIG. 1 and FIG. 9, the suspension system components 300 may further include a brake caliper 380, the knuckle device 200 may further include a fourth bracket 280 connected to the brake caliper 380, and the fourth bracket 280 may include a fourth body 282 that has a fourth through-hole 284 through which the assembly end portion 122 passes, and a fourth mounting end portion 286 that extends from the fourth body 282 and is connected to the brake caliper 380.

That is, the suspension system components 300 connected to the knuckle may further include the brake caliper 380, and the brake caliper 380 may be connected to the fourth bracket 280 to be assembled to the bearing device 100 together with the other brackets.

To the present end, the fourth bracket 280 includes the fourth body 282 having the fourth through-hole 284 and the fourth mounting end portion 286, and the fourth mounting end portion 286 is connected to the brake caliper 380. The direction of the fourth mounting end portion 286 extending from the fourth body 282 may be changed according to the position where the brake caliper 380 is disposed. In addition, to securely fix and position the brake caliper 380, the fourth mounting end portion 286 may include a plurality of divided fourth mounting end portions extending from the fourth body 282 to be bolted to the brake caliper 380.

The fourth body 282 of the fourth bracket 280 may have a plurality of recessed grooves 288 formed around the fourth through-hole 284.

The weight of the fourth bracket 280 can be reduced by forming the recessed grooves 288 in the fourth body 282 of the fourth bracket 280. Of course, a single recessed groove may be formed to extend along the circumference of the fourth body 282, instead of the plurality of divided recessed grooves 288. The structure may be selectively applied according to the required strength of the fourth bracket 280 and the fastening position of the bolt.

As illustrated in FIG. 1 and FIG. 3, long bolts B may be fastened to the brackets of the knuckle device 200 in the direction in which the assembly end portion 122 extends, so that the brackets are integrally fastened to each other.

Thus, the brackets of the knuckle device 200 may be fixedly disposed by the long bolts in the state in which they are coupled through the assembly end portion 122 of the bearing device 100, so that the bearing device 100 is integrally coupled to the knuckle device 200.

The recessed grooves are formed in each of the brackets wherein the recessed grooves are formed on the surface of a bracket and the protrusions are formed on the surface of the adjacent bracket facing the same, with the consequence that the fastening force between the brackets can be improved and the brackets can be securely fixed since the protrusions are inserted into the recessed grooves when the brackets are coupled to the assembly end portion.

In addition, the order in which the brackets are assembled to the assembly end portion may be changed, and the positions of the brackets may be properly adjusted according to the design requirements.

In accordance with the knuckle apparatus for a vehicle suspension system having the above-mentioned structure, since the suspension system components 300 connected to the knuckle include different materials by changing a portion to be substituted of the suspension system components to alter only a point corresponding to the changed component, the weight of the knuckle apparatus can be optimized.

In addition, it is possible to reduce manufacturing costs of the knuckle apparatus since there is no need to redesign the whole knuckle.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A knuckle apparatus for a vehicle suspension system, the knuckle apparatus comprising:
    a bearing device having a through-hole and an assembly end portion protruding and extending coaxially with the through-hole at an outside of the through-hole, the assembly end portion having a piped-shape; and
    a knuckle device having a plurality of brackets connected to a suspension system component and having a plurality of through-holes, each of the plurality of brackets having a corresponding through-hole of the plurality of through-holes, into which the assembly end portion is inserted,
    wherein the bearing device includes:
        a wheel hub having the through-hole of the bearing device and having the assembly end portion protruding and extending coaxially with the through-hole of the wheel hub at an outside of the through-hole of the wheel hub; and
        a wheel bearing provided in the through-hole inside the assembly end portion of the wheel hub.

2. The knuckle apparatus according to claim 1, wherein the assembly end portion has a flange protrudingly formed from a circumference of the assembly end portion, and the flange has a recessed groove formed around the assembly end portion.

3. The knuckle apparatus according to claim 1, wherein the bearing device further includes a locking ring configured to surround the assembly end portion and to be fitted to an extended end portion of the assembly end portion, to lock the knuckle device coupled through the assembly end portion.

4. The knuckle apparatus according to claim 3, wherein
the assembly end portion has a plurality of fitting protrusions formed circumferentially on an external peripheral surface thereof at an end portion thereof to protrude therefrom; and
the locking ring has a plurality of fitting grooves formed on an internal peripheral surface thereof to correspond to the plurality of fitting protrusions.

5. The knuckle apparatus according to claim 3, wherein the locking ring has a plurality of recessed grooves formed circumferentially on a side thereof.

6. The knuckle apparatus according to claim 1, wherein
the suspension system component includes a lower arm and a shock absorber; and
the knuckle device includes a first bracket connected to the lower arm and a second bracket connected to the shock absorber.

7. The knuckle apparatus according to claim 6,
wherein the plurality of through-holes of the knuckle device includes a first through-hole, and
wherein the first bracket includes a first body having the first through-hole through which the assembly end portion passes, and a first mounting end portion extending from the first body to be connected to the lower arm.

8. The knuckle apparatus according to claim 7, wherein the first body of the first bracket has a plurality of recessed grooves formed around the first through-hole.

9. The knuckle apparatus according to claim 6,
wherein the plurality of through-holes of the knuckle device includes a second through-hole, and
wherein the second bracket includes a second body having the second through-hole through which the assembly end portion passes, and a second mounting end portion extending from the second body to be connected to the shock absorber.

10. The knuckle apparatus according to claim 9, wherein the second body of the second bracket has a plurality of recessed grooves formed around the second through-hole.

11. The knuckle apparatus according to claim 6,
wherein the plurality of through-holes of the knuckle device includes a third through-hole,
wherein the suspension system component further includes a tie rod,
wherein the knuckle device further includes a third bracket connected to the tie rod, and
wherein the third bracket includes a third body having the third through-hole through which the assembly end portion passes, and a third mounting end portion extending from the third body to be connected to the tie rod.

12. The knuckle apparatus according to claim 11, wherein the third body of the third bracket has a plurality of recessed grooves formed around the third through-hole.

13. The knuckle apparatus according to claim 6,
wherein the plurality of through-holes of the knuckle device includes a fourth through-hole,
wherein the suspension system component further includes a brake caliper;
wherein the knuckle device further includes a fourth bracket connected to the brake caliper; and
wherein the fourth bracket includes a fourth body having the fourth through-hole through which the assembly end portion passes, and a fourth mounting end portion extending from the fourth body to be connected to the brake caliper.

14. The knuckle apparatus according to claim 13, wherein the fourth body of the fourth bracket has a plurality of recessed grooves formed around the fourth through-hole.

15. The knuckle apparatus according to claim 1, wherein a bolt is fastened to the plurality of brackets of the knuckle device in a direction in which the assembly end portion extends, so that the plurality of brackets is integrally fastened to each other.

16. A knuckle apparatus for a vehicle suspension system, the knuckle apparatus comprising:
a bearing device having a through-hole and an assembly end portion protruding and extending coaxially with the through-hole at an outside of the through-hole, the assembly end portion having a piped-shape; and
a knuckle device having a plurality of brackets connected to a suspension system component and having a plurality of through-holes, each of the plurality of brackets having a corresponding through-hole of the plurality of through-holes, into which the assembly end portion is inserted,
wherein the suspension system component includes a lower arm and a shock absorber; and
wherein the knuckle device includes a first bracket connected to the lower arm and a second bracket connected to the shock absorber.

17. A knuckle apparatus for a vehicle suspension system, the knuckle apparatus comprising:
a bearing device having a through-hole and an assembly end portion protruding and extending coaxially with the through-hole at an outside of the through-hole, the assembly end portion having a piped-shape; and
a knuckle device having a plurality of brackets connected to a suspension system component and having a plurality of through-holes, each of the plurality of brackets having a corresponding through-hole of the plurality of through-holes, into which the assembly end portion is inserted,
wherein a bolt is fastened to the plurality of brackets of the knuckle device in a direction in which the assembly end portion extends, so that the plurality of brackets is integrally fastened to each other.

* * * * *